UNITED STATES PATENT OFFICE.

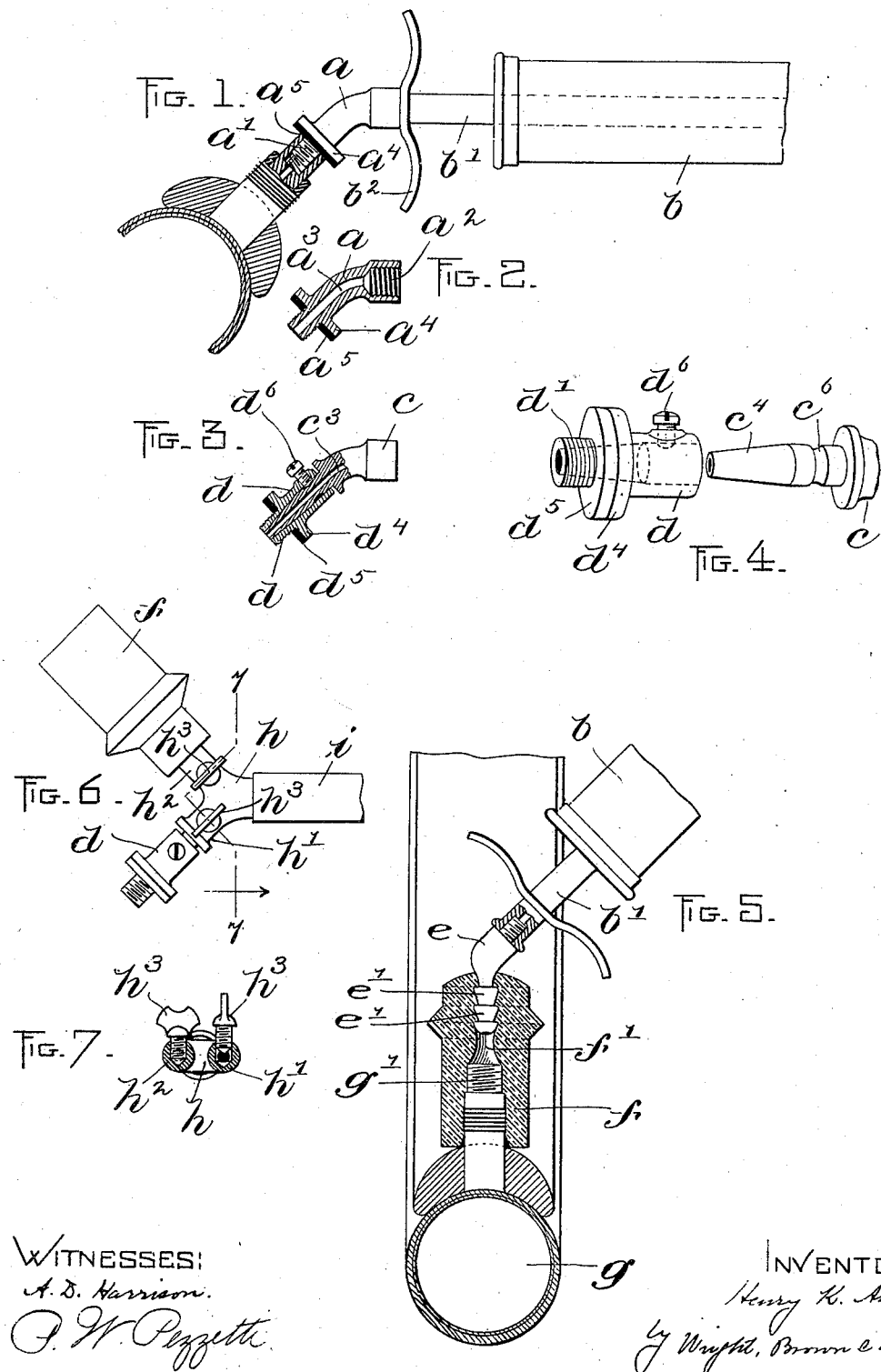

HENRY KNIGHT AUSTIN, OF READING, MASSACHUSETTS.

COUPLING FOR AIR-PUMPS.

SPECIFICATION forming part of Letters Patent No. 637,915, dated November 28, 1899.

Application filed June 17, 1898. Serial No. 683,666. (No model.)

*To all whom it may concern:*

Be it known that I, HENRY KNIGHT AUSTIN, of Reading, in the county of Middlesex and State of Massachusetts, have invented certain new and useful Improvements in Couplings for Air-Pumps, of which the following is a specification.

This invention relates to couplings for pneumatic-tire valves and pumps; and it consists in an improved coupling possessing those features of novelty in structure and arrangement which will be hereinafter fully described and claimed.

Reference is to be had to the accompanying drawings, in which—

Figure 1 represents a side elevation of a coupling constructed in accordance with my invention and applied to a pump. Fig. 2 represents a sectional view of the coupling. Fig. 3 represents a sectional view of another form of the coupling. Fig. 4 represents a perspective view of the same with its parts separated. Fig. 5 represents a view in section and elevation, showing a third embodiment of my invention, a portion of a tire and pump being also shown. Fig. 6 represents a side elevation of still another embodiment of my invention. Fig. 7 represents a section on the line 7 7 of Fig. 6.

Like reference characters indicate corresponding parts in the several figures.

Referring at first to Figs. 1 and 2, $a$ designates a coupling in the form of an elongated nipple having provisions at its ends for attachment to an air-pump and a tire-valve. Said provisions consist in screw-threading one end externally, as at $a'$, to engage the internally-screw-threaded orifice of a tire-valve casing and screw-threading the other end internally, as at $a^2$, to engage the external thread usually provided on an inflating-pump, such as the pump $b$. The latter is of the style usually carried in the tool-bag of the bicycle or similar vehicle or by the rider, the same having a hollow piston-rod $b'$ externally threaded at its outer end and provided with a handle $b^2$. The coupling or nipple $a$ is preferably composed of a non-oxidizing metal, such as brass, and is formed with a bent or flexed air-conduit $a^3$, which conforms to an external bend in the nipple, the orifices of the conduit being directed at an angle to each other. The valve of a pneumatic tire being ordinarily in the plane of the tire or wheel, it will be seen that when the end $a'$ of the nipple $a$ is attached to said valve the other end of the nipple may be directed out of the plane of the tire by turning said nipple in the proper manner. A seating-flange $a^4$, formed on the nipple, supports an annular packing-washer $a^5$, composed of a compressible material, such as rubber. When the nipple is screwed into the valve, the washer $a^5$ is compressed between the flange $a^4$ and the annular mouth of the valve and forms a sufficiently air-tight joint, permitting the nipple to be turned so that its pump-attaching end lies crosswise of the wheel. The pump is then attached to the nipple $a$, and by reason of the position of said pump off to one side of the wheel the tire may be conveniently inflated without interference of the spokes of the wheel with the operator's hand.

It will be seen that the coupling or nipple $a$ occupies but a small space and is superior to the ordinary rubber-hose coupling employed, being less likely to leak and waste air. The ordinary coupling is composed of a length of flexible pipe or hose having metal nipples in its ends, and it frequently leaks at the joints between the hose and the nipples.

Figs. 3 and 4 represent a coupling consisting of two sections or members—a member $c$, suitably screw-threaded to engage a part of an air-pump, and a member or nipple $d$, screw-threaded at $d'$ to engage the tire-valve and having a seating-flange $d^4$ and compressible washer $d^5$. The pump member $c$ of the coupling is provided with a reduced and tapered nozzle $c^4$, which fits in a correspondingly-tapered socket in the nipple $d$, and said member $c$ is further formed with a circumferential groove $c^6$ and an internal bent or flexed conduit $c^3$, conforming to a bend in the member. The groove $c^6$ is engaged by the end of a screw $d^6$, mounted in the side wall of the nipple $d$, and the two members are thereby held together and permitted to rotate with respect to each other, the end of the screw not touching the bottom of the groove. The screw may be retracted to permit the separation of the two members and the substitution of a nipple having a different-sized valve-thread. This form of coupling may remain attached to the inflating-pump while the coupling is being attached to or removed from the tire-valve, for the described connection of the members $c\ d$ permits the member $d$ to be screwed into or out of the valve without turning the member $c$. The groove $c^6$ is preferably made sufficiently wide to permit of some longitudinal play of the nozzle $c^4$ in its socket in the nipple $d$, so that when said nipple has been attached to the valve the said tapered nozzle may be forced tightly into its socket to make an air-tight joint.

Fig. 5 represents another modification of the invention, wherein the coupling consists of a bent or flexed member $e$, formed with a bent or flexed internal conduit and suitably screw-threaded at one end for attachment to a pump, and a member or nipple $f$, composed of india-rubber and formed with an internal aperture or conduit $f'$, which may be distended to embrace the member $e$ and the valve $g'$ of a tire $g$. The end of the member $e$ is shown as formed with annular ridges or corrugations $e'\ e'$, and the upper orifice of the nipple $f$ may be correspondingly formed, with the object of securing an air-tight fit. The nipple $f$ provides a universal coupling adapted to fit any tire-valve of the ordinary patterns and is also useful for effecting a quick juncture of a pump and valve. With these objects in view the said nipple $f$ could obviously be employed in connection with either of the couplings shown in Figs. 1 to 4, the elastic nipple being forced over the valve end of the coupling, said nipple then forming a part of the coupling.

In Figs. 6 and 7 the feature of a permanently flexed or bent air-conduit is shown as embodied in a coupling having two branches, with provisions for attachment to a source of air-supply, and means at the end of each branch for attaching the coupling to a tire-valve. $h$ is a member having two forks or branches $h'\ h^2$ and an internal bifurcated conduit extending through the body and branches of the member. The branch $h'$ is provided with a nipple $d$ similar to the nipple $d$ shown in Figs. 3 and 4 and screw-threaded for attachment to a tire-valve, and the branch $h^2$ is provided with an elastic nipple $f$ similar to the nipple $f$ shown in Fig. 5. The rear end of the member $h$ in usual practice is internally threaded, similarly to the form shown in Fig. 2, to engage the external threads on the end of a hollow piston-rod, such as indicated at $b'$ in Figs. 1 and 5; but so far as this feature of my invention is concerned—viz., the two-branched coupling—the said member $h$ may be constructed for attachment to a flexible pipe, such as $i$, connected with a pump, tank, or other source of air-supply, or may be otherwise constructed for connection to such source of supply. Screw-valves or shut-off cocks $h^3\ h^3$ are shown in the two branches of the member $h$, said valves providing means for shutting off the air from that branch which is not in use. It is well known that the majority of tire-valves have a standard-size thread, and therefore in using this compound coupling if the nipple $d$ is of a corresponding size the branch $h'$ of the coupling may be used to connect with the majority of valves; but in case of a valve having a different thread the coupling may still be used by employing the branch $h^2$, having the elastic nipple $f$, and in all cases where it is desired to effect a quick juncture the said nipple $f$ may be employed.

It will be understood that the pump-barrel $b$ and the hollow piston-rod $b'$ illustrated in the drawings are of the ordinary hand type, in which the said piston-rod is adapted to reciprocate and rotate in the barrel, so that the barrel during its reciprocating movements on the piston-rod may freely rotate thereon under the influence of the moving hand of the operator without using care to prevent spiral movements. With this form of pump my coupling is particularly adapted to be employed, the coupling—that is, the bent or flexed portion—being rigidly connected with the outer end of the hollow piston-rod. Therefore any reciprocating movements of the barrel involving also rotary or spiral movements will not be communicated to the coupling in such manner as to have a tendency to twist or displace the latter.

Having thus explained the nature of my invention and described the manner of employing the same, although without having attempted to set forth all the forms in which it may be embodied or all the modes of its use, I declare that what I claim is—

1. An air-pump comprising a barrel and a hollow piston-rod adapted to reciprocate and rotate therein and having a coupling formed with a permanently bent or flexed metal conduit rigidly connected with the end of said piston-rod, and a secondary section or supplemental conduit rotatively connected with said bent or flexed conduit and formed to be connected with a tire-valve.

2. An air-pump comprising a barrel and a hollow piston-rod adapted to reciprocate and rotate therein and having a coupling consisting of two sections, one section having provisions for attachment to a valve and the other section being formed with a permanently bent or flexed metal conduit and rigidly connected with the end of said piston-rod, the two sections being loosely connected together to enable the first-mentioned section to be conveniently engaged with a tire-valve without rotation of the permanently-bent section.

3. An air-pump having a coupling consisting of two sections, one section having provisions for attachment to a valve and the other section being formed with a permanently bent or flexed metal conduit, the two sections having a connection comprising a tapered nozzle on the one fitting a tapered socket in the other, and suitable retaining means constructed to permit rotation of one section with respect to the other, and to normally prevent the separation of the sections.

4. A coupling for air-pumps, consisting of a section formed with a permanently bent or flexed conduit and screw-threaded to engage the pump, and another section connected to the first-named section and having elastic walls adapted to be distended to engage the valve.

5. A device of the character specified, comprising a member having two branches and a bifurcated conduit, and provisions for connection with a source of air-supply, and means at the ends of said branches for connecting the member to tire-valves of different sizes.

6. A device of the character specified, comprising a member having two branches and a bifurcated conduit, and provisions for connection with a source of air-supply, a nipple attached to one branch and constructed to rotate thereon, said nipple being screw-threaded to engage a tire-valve, a member connected with the other branch and having elastic walls adapted to be distended to engage a tire-valve, and means for controlling the air-delivery in the bifurcated conduit.

In testimony whereof I have affixed my signature in presence of two witnesses.

HENRY KNIGHT AUSTIN.

Witnesses:
HORACE BROWN,
A. D. HARRISON.